(12) United States Patent
Papst

(10) Patent No.: US 6,344,946 B1
(45) Date of Patent: Feb. 5, 2002

(54) DISK STORAGE DEVICE WITH IMPROVED SPINDLE TORQUE AND ACCELERATION

(75) Inventor: Georg F. Papst, Spaichingen (DE)

(73) Assignee: Papst Licensing GmbH, Spaichingen (DE)

( * ) Notice: Subject to any disclaimer, the term of this patent is extended or adjusted under 35 U.S.C. 154(b) by 0 days.

(21) Appl. No.: 09/427,001

(22) Filed: Oct. 26, 1999

Related U.S. Application Data

(63) Continuation of application No. 08/834,700, filed on Apr. 1, 1997, now Pat. No. 6,005,746.

(51) Int. Cl.[7] ............................................. G11B 19/20
(52) U.S. Cl. ................................. 360/99.08; 360/98.07
(58) Field of Search ........................... 360/98.07, 99.04, 360/99.08

(56) References Cited

U.S. PATENT DOCUMENTS

| | | | |
|---|---|---|---|
| 3,250,929 A | 5/1966 | Maier | 310/68 R |
| 3,596,121 A | 7/1971 | Sheldon | 310/166 |
| 3,691,542 A | 9/1972 | Gabor | 360/99.08 |
| 3,706,085 A | 12/1972 | Mowrey et al. | 360/99.12 |
| 3,845,339 A | 10/1974 | Merkle et al. | 310/156.34 |
| 3,864,748 A | 2/1975 | Herdman et al. | 360/102 |
| 3,922,590 A | 11/1975 | Warren et al. | 318/138 |
| 4,054,931 A | 10/1977 | Bolton et al. | 360/97.03 |
| 4,062,049 A | 12/1977 | Dirks | 360/78.12 |
| 4,101,945 A | 7/1978 | Butsch | 360/99.04 |
| 4,115,715 A | 9/1978 | Müller | 310/68 B |
| 4,150,406 A | 4/1979 | Stollorz | 360/97.01 |
| 4,167,692 A | 9/1979 | Sekiya et al. | 318/138 |
| 4,174,484 A | 11/1979 | Schmider | 310/68 R |
| 4,181,867 A | 1/1980 | Muller | 310/156.34 |
| 4,185,308 A | 1/1980 | Fujioka | 360/97.02 |
| 4,197,489 A | 4/1980 | Dunn et al. | 318/138 |
| 4,216,512 A | 8/1980 | Vidwans | 360/133 |
| 4,275,339 A | 6/1981 | Burke et al. | 318/138 |
| 4,285,016 A | 8/1981 | Gilovich | 360/84 |
| 4,307,425 A | 12/1981 | Kaneko et al. | 360/97.03 |
| 4,329,604 A | 5/1982 | Dunstan et al. | 310/68 R |

(List continued on next page.)

FOREIGN PATENT DOCUMENTS

| | | |
|---|---|---|
| CH | 654 455 A5 | 2/1986 |
| DE | 2325473 | 12/1974 |
| DE | 2421379 | 11/1975 |

(List continued on next page.)

OTHER PUBLICATIONS

Drawing "GAE Motor:" (1 sheet) Papst–Motoren KG.
Drawing "Motor 933 5310 00" (2 sheets) Papst–Motoren KG.
European Search Report, Application No. EP 97 10 5429 (Aug. 6, 1997).

(List continued on next page.)

*Primary Examiner*—Jefferson Evans
(74) *Attorney, Agent, or Firm*—Finnegan, Henderson, Farabow, Garrett & Dunner LLP

(57) ABSTRACT

A disk storage device that utilizes an inner rotor spindle motor in which the spindle shaft is fixed to the disk mounting hub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber. Further, the motor elements are located outside the clean room chamber, further enhancing the cleanliness of the environment surrounding the data storage disks.

19 Claims, 3 Drawing Sheets

U.S. PATENT DOCUMENTS

| | | | |
|---|---|---|---|
| 4,336,470 A | 6/1982 | Gutris | 310/42 |
| 4,337,491 A | 6/1982 | Hasler et al. | 360/97.02 |
| 4,352,133 A | 9/1982 | Hager | 360/106 |
| 4,394,594 A | 7/1983 | Schmider et al. | 310/68 R |
| 4,396,964 A | 8/1983 | Morehouse et al. | 360/97.03 |
| 4,430,603 A | 2/1984 | Muller | 318/254 |
| 4,438,542 A | 3/1984 | Schuh | 360/97.01 |
| 4,471,395 A | 9/1984 | Beck et al. | 360/98.04 |
| 4,519,010 A | 5/1985 | Elsaesser et al. | 360/99.08 |
| 4,535,373 A | 8/1985 | Schuh | 360/97.03 |
| 4,554,473 A | 11/1985 | Muller | 310/67 R |
| 4,556,829 A | 12/1985 | von der Heide | 318/254 |
| 4,599,664 A | 7/1986 | Schuh | 360/99.08 |
| 4,604,665 A | 8/1986 | Müller et al. | 360/97.02 |
| 4,607,182 A | 8/1986 | Ballhaus | 310/90 |
| 4,656,545 A | 4/1987 | Kakuta | 360/97.03 |
| 4,658,312 A | 4/1987 | Elsásser et al. | 360/99.08 |
| 4,672,250 A | 6/1987 | Seitz | 310/90 |
| 4,698,542 A | 10/1987 | Muller | 310/67 R |
| 4,701,653 A | 10/1987 | Merkle et al. | 310/152 |
| 4,739,425 A | 4/1988 | Dierkes et al. | 360/98.08 |
| RE32,702 E | 6/1988 | Hasler et al. | 360/99.08 |
| 4,760,298 A | 7/1988 | Kitahara et al. | 310/67 |
| 4,775,906 A | 10/1988 | Suzuki et al. | 360/98.08 |
| 4,797,762 A | 1/1989 | Levy et al. | 360/99.06 |
| 4,805,055 A | 2/1989 | Wright | 360/106 |
| 4,843,500 A | 6/1989 | Elsaesser et al. | 360/97.02 |
| 4,905,110 A | 2/1990 | Krum et al. | 360/99.08 |
| 4,922,406 A | 5/1990 | Schuh | 360/97.03 |
| 4,949,000 A | 8/1990 | Petersen | 310/179 |
| 4,965,476 A | 10/1990 | Lin | 310/51 |
| 4,991,211 A | 2/1991 | Cap et al. | 360/84 |
| 5,001,581 A | 3/1991 | Elsasser et al. | 360/97.02 |
| 5,128,819 A | 7/1992 | Elsaesser et al. | 360/99.08 |
| 5,132,856 A | 7/1992 | Takahashi | 360/99.08 |
| 5,157,295 A | 10/1992 | Stefansky et al. | 310/90 |
| 5,173,814 A | 12/1992 | Elsasser et al. | 360/98.07 |
| 5,216,557 A | 6/1993 | Elsaesser et al. | 360/99.08 |
| RE34,412 E | 10/1993 | Elsasser et al. | 360/99.08 |
| 5,256,922 A | 10/1993 | Tanaka et al. | 310/71 |
| 5,296,981 A | 3/1994 | Ogawa | 360/99.08 |
| 5,331,483 A | 7/1994 | Muller et al. | 360/86 |
| 5,333,079 A | 7/1994 | Takegami et al. | 360/99.08 |
| 5,352,947 A | 10/1994 | MacLeod | 310/67 R |
| 5,382,853 A | 1/1995 | von der Heide et al. | 310/67 R |
| 5,400,197 A | 3/1995 | Jabbari et al. | 360/99.08 |
| 5,410,201 A | 4/1995 | Tanaka et al. | 310/68 B |
| 5,422,769 A | 6/1995 | Elsaesser et al. | 360/99.08 |
| 5,424,887 A | 6/1995 | Schuh | 360/97.03 |
| 5,444,586 A * | 8/1995 | Iftikar et al. | 360/99.12 |
| 5,446,610 A | 8/1995 | Elsaesser et al. | 360/99.08 |
| 5,519,270 A * | 5/1996 | Yamada et al. | 310/67 R |
| 5,528,436 A | 6/1996 | Peter | 360/99.08 |
| 5,548,458 A | 8/1996 | Pelstring et al. | 360/99.08 |
| 5,557,487 A * | 9/1996 | Elsaesser et al. | 360/99.08 |
| 5,596,235 A | 1/1997 | Yazaki et al. | 310/67 R |
| 5,619,389 A | 4/1997 | Dunfield et al. | 360/98.07 |
| 5,661,351 A | 8/1997 | von der Heide et al. | 310/67 R |
| 5,708,539 A | 1/1998 | Schuh | 360/97.03 |
| 5,729,403 A | 3/1998 | Schuh | 360/97.03 |
| RE35,792 E | 5/1998 | Elsasser et al. | 360/98.07 |
| 5,774,302 A | 6/1998 | Elsaesser et al. | 360/98.07 |
| 5,777,822 A * | 7/1998 | Schuh | 360/97.03 |
| RE36,016 E * | 12/1998 | Cap et al. | 360/97.01 |
| 5,864,443 A | 1/1999 | Elsaesser et al. | 360/99.08 |
| 5,877,916 A | 3/1999 | Papst | 360/98.07 |
| 5,880,545 A * | 3/1999 | Takemura et al. | 310/90 |
| 5,907,456 A * | 5/1999 | Khan et al. | 360/99.08 |
| 5,946,161 A | 8/1999 | Schuh | 360/97.03 |
| 6,005,746 A | 12/1999 | Papst | 360/98.07 |

FOREIGN PATENT DOCUMENTS

| | | |
|---|---|---|
| DE | 2749729 | 5/1979 |
| DE | 3049334 A1 | 10/1981 |
| DE | 3144629 A1 | 7/1982 |
| DE | 3326543 | 1/1985 |
| EP | 0 015 739 B1 | 4/1983 |
| EP | 0 094 484 A1 | 11/1983 |
| EP | 0 098 010 A1 | 1/1984 |
| EP | 0 151 259 | 8/1985 |
| EP | 0 172 459 A2 | 2/1986 |
| EP | 0 172 459 | 2/1986 |
| EP | 0 263 932 | 4/1988 |
| EP | 287 768 | 10/1988 |
| EP | 0291295 | 11/1988 |
| EP | 425 312 A2 | 5/1991 |
| EP | 0 685 843 A1 | 12/1995 |
| GB | 1 328 717 | 8/1973 |
| GB | 1 407 431 | 9/1975 |
| GB | 1 434 192 | 5/1976 |
| GB | 1 486 070 | 9/1977 |
| GB | 1486070 | 9/1977 |
| GB | 1 572 586 | 7/1980 |
| GB | 2075240 | 11/1981 |
| GB | 2 092 834 A | 8/1982 |
| GB | 2166586 | 5/1986 |
| GB | 2195812 | 4/1988 |
| GB | 2 218 857 A | 11/1989 |
| JP | 53-55509 | 10/1951 |
| JP | 49-34714 | 6/1972 |
| JP | 48-86510 | 11/1973 |
| JP | 48-87809 | 11/1973 |
| JP | 49-85110 | 7/1974 |
| JP | 49-719909 | 7/1974 |
| JP | 50-128510 | 10/1975 |
| JP | 50-152708 | 12/1975 |
| JP | 51-33410 | 3/1976 |
| JP | 51-57011 | 5/1976 |
| JP | 51-26669 | 7/1976 |
| JP | 51-84516 | 7/1976 |
| JP | 51-121306 | 10/1976 |
| JP | 51-151513 | 12/1976 |
| JP | 52-6914 | 1/1977 |
| JP | 52-42209 | 3/1977 |
| JP | 52-170004 | 12/1977 |
| JP | 53-39727 | 4/1978 |
| JP | 53-51719 | 5/1978 |
| JP | 53-55106 | 5/1978 |
| JP | 53-55724 | 5/1978 |
| JP | 53-57010 | 5/1978 |
| JP | 53-76809 | 6/1978 |
| JP | 54-41619 | 3/1979 |
| JP | 49-46716 | 5/1979 |
| JP | 54-58011 | 5/1979 |
| JP | 54-139819 | 9/1979 |
| JP | 54-136309 | 10/1979 |
| JP | 54-156106 | 12/1979 |
| JP | 55-141258 | 8/1980 |
| JP | 56-107364 | 8/1981 |
| JP | 58-22571 | 2/1983 |
| JP | 58-30965 | 2/1983 |
| JP | 58-159201 | 9/1983 |
| JP | 58-200480 | 11/1983 |
| JP | 60-103554 | 6/1985 |
| JP | 62-125573 | 6/1987 |
| JP | 03222150 | 10/1991 |
| JP | 04172951 | 6/1992 |
| JP | 04178151 | 6/1992 |
| JP | 05094669 | 4/1993 |
| JP | 08065941 | 3/1996 |
| WO | WO 84/01863 | 5/1984 |

OTHER PUBLICATIONS

European Search Report, Application No. EP 97 10 5430 (Aug. 6, 1997).

European Search Report, Application No. EP 97 10 5430 (Jan. 27, 1998).

International Search Report, Application No. PCT/EP97/01629 (Nov. 24, 1997).

International Search Report, Application No. PCT/EP97/01630 (Aug. 8, 1997).

United Kingdom Search Report, Application No. GB 9706578.3 (Jun. 18, 1997).

United Kingdom Search Report, Application No. GB 9706577.5 (Jun. 18, 1997).

Drawing "Inner–Rotor Spindle Motor in Hard Disk Drive Seagate ST 3630A Medalist" (1 sheet).

Isozaki et al. "Fixed–Head Disk Memory Unit for High Reliability Applications," *NEC Research & Development*, No. 44, Jan. 1977, pp. 57–67.

J. Swartz, "Motor in Spindle Gives Micro–Winchester Room for 140M Bytes," *Mini–Micro Systems*, Feb. 1983, pp. 143–146.

M. Pearce, "Who Needs High Capacities?" *Computer Systems*, Nov. 1983, pp. 81–84.

V.J. Trotter, Jr., "Plastic Rigid Seat to Trap Airborne Submicron Particles," *IBM Technical Disclosure Bulletin*, vol. 19, No. 4, Sep. 1976, 1 page.

Control Data Corporation, Control Data Fixed Disk Drive: General Description, Operation, Installation and Checkout, Theory of Operation, Diagrams, Maintenance, Maintenance Aids, Parts Data; Magnetic Peripherals, Inc., Hardware Maintenance Manual, 6 pages.

German "Diskettenantrieb" Article, Apr. 1983, pp. 56–59.

\* cited by examiner

DISK STORAGE DEVICE WITH IMPROVED SPINDLE TORQUE AND ACCELERATION

This is a continuation of application Ser. No. 08/834,700, filed Apr. 1, 1997, now U.S. Pat. No. 6,005,746.

This invention relates to disk storage devices and, more particularly, to a disk storage device having a spindle motor with enhanced torque, acceleration and vibration characteristics.

BACKGROUND OF THE INVENTION

Disk storage devices, especially disk storage devices utilizing one or more rigid magnetic data storage disks directly coupled to the rotor of a spindle drive motor typically use an "outer rotor" brushless DC motor for rotating the storage disks past data read/write heads. The heads write and read digital data on the surface of the disks. In an "outer rotor" brushless motor, a rotor having an annular permanent magnet surrounds a multi-pole stator that is mounted concentric with the shaft defining the rotation axis of the motor.

An outer rotor motor employs a rotor that encompasses the stator element. The rotor therefore requires a diameter that adds to the mass and angular inertia of the rotor and increases the time required for the motor to reach the operating speed, which may be 6000 RPM or higher, at the time of startup. The radially displaced mass also amplifies vibrations due to imbalances, especially at higher operational speeds.

It is an object of the invention to provide a disk storage device that utilizes a spindle drive motor that has a reduced rotary mass and angular inertia and accordingly reduces the time required to accelerate the storage disks to operating speed at the time of startup.

It is a further object to provide a disk storage device that has an increased diameter spindle support structure to enhance the rigidity of the disk axis.

Still a further object is to provide a disk storage device that reduces the amount of spindle run out caused by play in the support bearings.

Another object is to allow location of the drive elements of the spindle motor outside the clean room chamber without significantly increasing the mass or angular inertia of the rotating elements.

Yet another object is to provide a disk storage device that reduces radially-displaced spindle mass and is capable of operation at higher speeds with lower vibration.

SUMMARY OF THE INVENTION

The foregoing and other objects are achieved by providing a disk storage device that utilizes an inner rotor spindle motor in which the spindle shaft is fixed to the disk mounting hub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber. Further, the motor elements are located outside the clean room chamber, further enhancing the cleanliness of the environment surrounding the data storage disks.

These and other objects, features and advantages of the invention are illustrated in the following description of preferred embodiments, as illustrated in the drawings as follows.

DETAILED DESCRIPTION OF PREFERRED EMBODIMENTS

Figure 1:
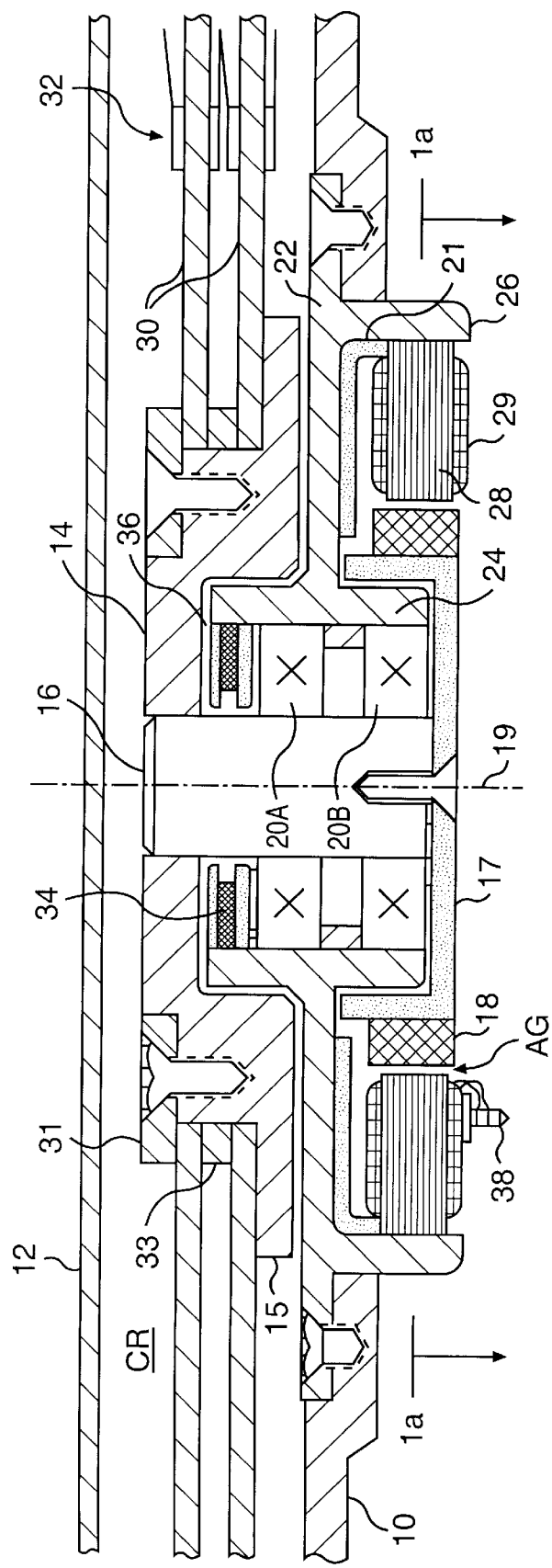
FIG. 1 is a cross-sectional view taken along the spindle axis of a first embodiment of disk storage device according to the invention.

Referring to FIG. 1, a first embodiment of a disk storage device according to the invention includes a housing having a base plate 10 and a partition 12. Base plate 10 and partition 12 cooperate with side walls (not shown) to define a clean room chamber CR. The chamber CR is a finally sealed clean room manufactured to HDD industry contamination standards for controlling the amount of particulate matter and other contaminants coming into contact with the storage disks.

Data storage disks 30, which may be magnetic hard disks, are located within the clean-room and cooperate with data read/write transducers 32. Transducers 32 are mounted on actuator arms to move relative to the surface of the disks to read and write (record) data in tracks on the storage surfaces. Each storage disk 30 has a central opening of standard diameter that fits over the disk mounting portion of a hub 14. The hub 14 is press-fit on, or otherwise attached to, a shaft 16 that is supported to rotate about spindle axis 19. The storage disks 30 are coupled to the hub 14 by a radially-extending disk support flange 15, spacer ring 33, and clamping ring 31 in a conventional manner.

The shaft 16 and hub 14 are rotatably driven by a brushless D.C. motor having a rotor 17 and stator 28. Rotor 17 may be made of a ferromagnetic material such as soft iron or steel and is circular with a cylindrical flange at its periphery. An annular permanent magnet 18 is affixed to the peripheral flange of the rotor. Magnet 18 is surrounded by the stator lamination 28 and is spaced from the stator pole faces to form a cylindrical air gap AG.

Figure 1A:
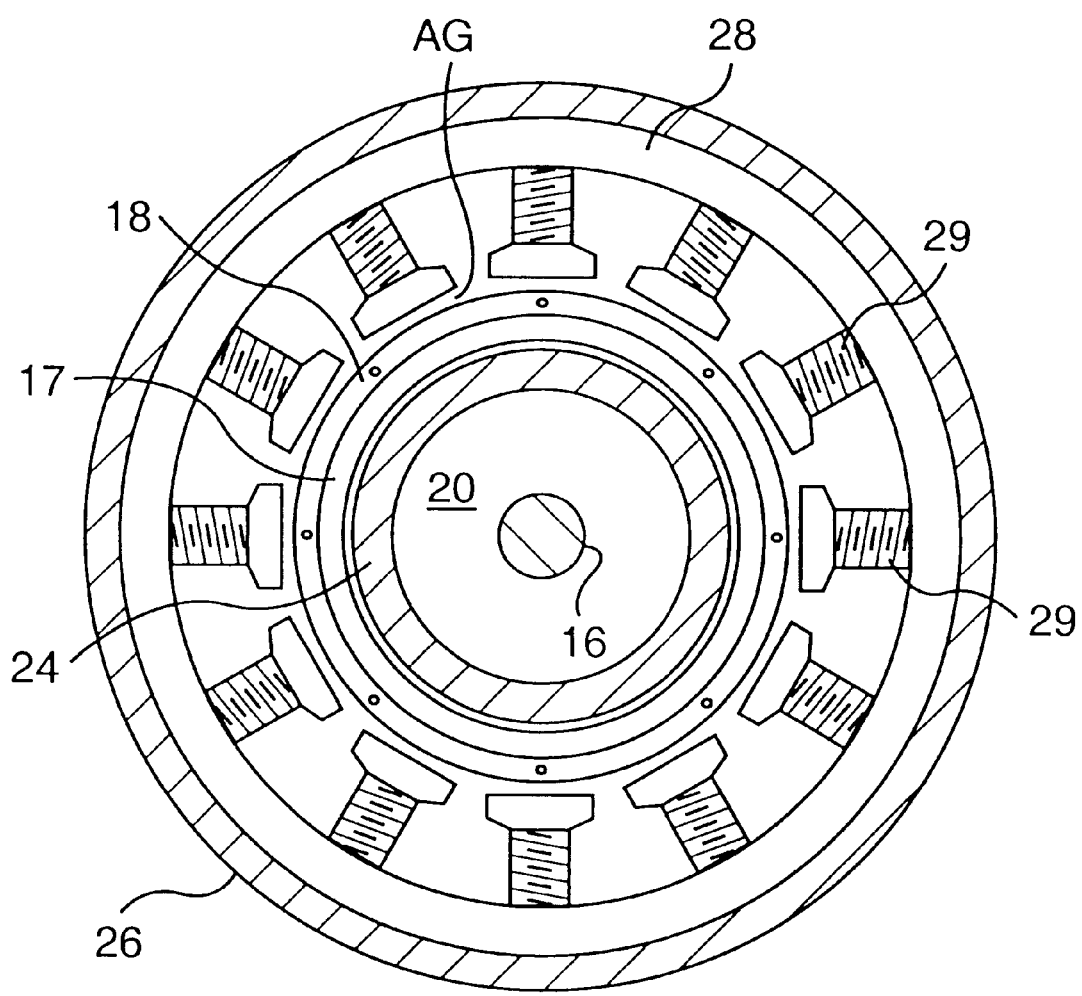
FIG. 1a is a cross-sectional view taken along the line 1a—1a of FIG. 1 showing how the stator cooperates with the rotor and rotor magnet.

The relationship between the stator elements and the rotor are illustrated in FIG. 1a. The stator is supported on a cylindrical projection 26 which is part of an assembly flange 22 (FIG. 1). Flange 22 fits into a circular opening in the base plate 10 and is attached thereto by fasteners such as screws. Assembly flange 22 includes a bearing tube 24 that is concentric with the spindle axis 19. Bearing tube 24 supports on its cylindrical inner surface a pair of axially spaced bearings 20A and 20B that rotatably support shaft 16.

Timed current pulses are supplied from a motor control circuit (not shown) through a contact member 38 to the stator windings. Magnetic flux generated by the stator windings within lamination 28 interacts with the flux produced by the rotor magnet 18 to apply torque to rotor 17. The latter in turn rotates the shaft 16, hub 14 and disks 30 to move the storage surfaces of the disks past read/write heads 32 so that data transfer occurs between the heads and the data storage tracks on the disks. A ferromagnetic shielding ring 21 is affixed to the flange 22 adjacent the magnet 18, air gap and stator 28. The ring 21 prevents any stray flux produced by the motor parts from penetrating the clean-room and impinging on the data storage surfaces of the disks.

Contaminants such as particulate matter emanating from the stator and rotor elements cannot migrate into the clean room because the motor is mounted outside the clean room on the opposite side of the base plate 10. A cover (not shown) may be affixed to the projection 26 to enclose the stator and rotor to keep foreign objects from interfering with motor operation. However, a printed circuit board supporting the motor control circuitry and other circuit elements may be affixed in a frame suspended below the base plate to serve the same function, making a separate motor cover unnecessary.

Bearings 20A and 20B are also a source of contaminants. A sealing member 34, such as a ferrofluidic sealing ring, is inserted at the end of bearing tube 24 closest to the clean room to prevent contaminants from entering the clean room. Alternatively, the underside of hub 14 and the outer diameter of the upper portion of bearing tube 24 can be precisely machined to establish at narrow gap 36. Gap 36 may operate as a "gap seal," making it possible to eliminate the seal 34 or replace it with a simple ring or washer 35, as illustrated in FIG. 2.

Because the rotor 17 is arranged as an inner rotor, it has a reduced radial dimension as compared to an outer rotor of comparable torque. This enables the mass of the rotor to be reduced and displaced inwardly so that the moment of inertia of the rotating structure is reduced, allowing more rapid acceleration of the spindle at the time of startup. Further, placement of the stator at the periphery of the motor frees up space near the spindle axis. This allows the bearings to be separated by a greater axial distance without increasing the height of the spindle. As a result a more compact disk storage device can be constructed without the need to position the motor inside the clean room.

Figure 2:
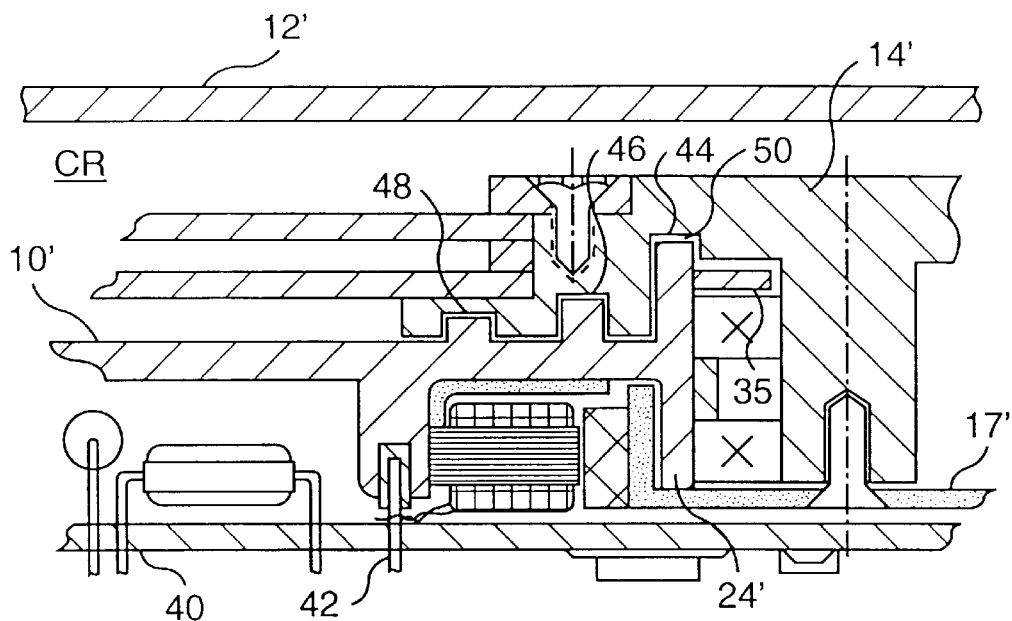
FIG. 2 is a cross-sectional view taken along the spindle axis of a second embodiment of disk storage device according to the invention.

Referring to FIG. 2, the embodiment there shown is similar to that of FIG. 1 but uses gap-type seals in place of ferrofluidic seal 34. The spindle motor of FIG. 2 is integrated into the base plate 10, rather than mounted on a separate assembly flange as shown in FIG. 1. It also employs an integral hub and shaft 14' i.e., the shaft and hub are formed together as a one-piece unit out of a material such as an aluminum alloy or steel. A washer 35 is inserted near the top of bearing tube 24' and functions to entrap particles from the bearings within the bearing tube. Particles that escape through the narrow gap between the shaft portion of the hub/shaft 14' and washer 35 enter a gap 50 formed between the underside of hub 14' and the top of bearing tube 24'. An annular groove 44 in the underside of the hub meshes with the upper end of the bearing tube so that gap 50 is in the form of a labyrinth seal. This seal further retards the migration of contaminant particles toward the clean room. Additional labyrinth seals may be provided via further annular grooves, such as those shown at 46 and 48, machined into the underside of the hub. These grooves mesh with raised annular projections formed on the upper side of the base plate 10', providing two additional labyrinth seals for retarding the transfer of contaminants still further.

FIG. 2 also shows a printed circuit board (PCB) 40 suspended on a frame (not shown) parallel to the base plate in the area of the spindle motor. PCB 40 supports motor control circuitry for generating the timed current pulses that energize the stator windings of the motor. Electrical connection of the stator circuits with the control circuitry is achieved through use of a connector pin 42 mounted within in an insulating bushing on the outside of base plate 10'. This type of connection simplifies the manufacturing process and facilitates easy removal of PCB 40 for testing and repair purposes.

Figure 3:
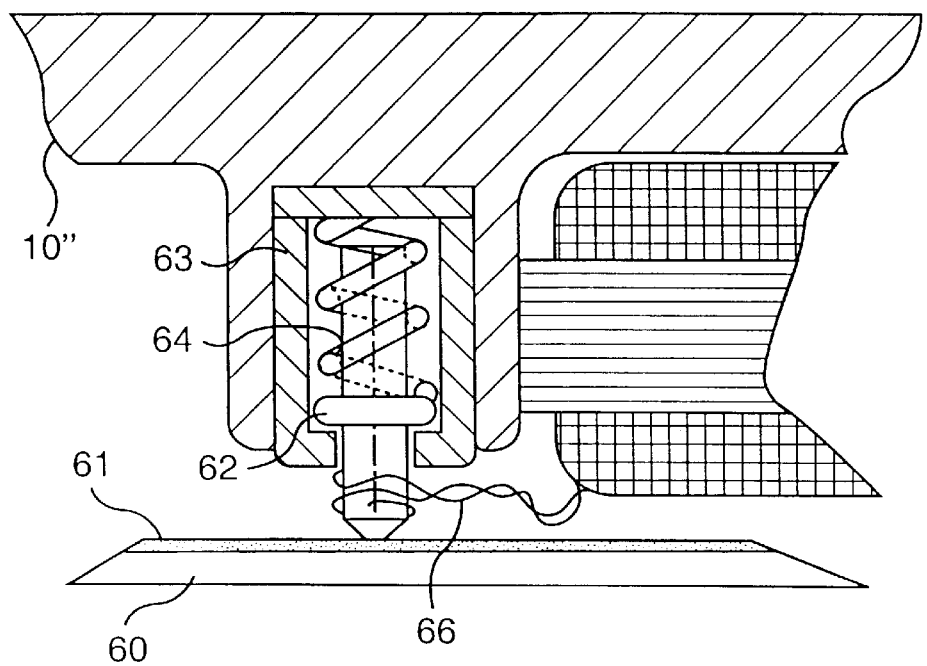
FIG. 3 is a cross-sectional view of a portion of a third embodiment of the invention showing an alternate form of electrical contact device for connecting the stator windings to control circuitry that is mounted external to the housing of the disk storage device.

FIG. 3 shows a modified form of quick-disconnect contact member that includes a contact pin 62 mounted in base plate 10" within an insulated housing 63. A spring 64 biases contact pin 62 toward PCB 60. A conductive pad 61 is provided on PCB 60 to conductively engage the tip of contact 62. Stator leads 66 are connected to contact pin 62 to couple the control pulses to the stator windings. Pin 62 and pad 61 may be plated with a highly conductive material such as gold or silver to enhance the electrical integrity of the connection.

The disk storage device of the invention provides several advantages. The motor elements can be located outside the clean room, whereby the danger of clean room contamination is reduced, while reducing, or at least without materially increasing, the mass or angular inertia of the rotating elements. This, in turn, improves the acceleration characteristics of the disk drive at the time of startup. Further, the mass of the rotating elements of the spindle motor is both reduced and displaced toward the axis of rotation, enabling improvement in acceleration characteristics and reducing vibrations caused by imbalance in the rotating parts. Still further, removal of the stator from the area immediately surrounding the spindle axis leaves more space in that region that is utilized for achieving greater axial separation of the bearings. This reduces spindle run out caused by bearing wear and play. Additionally, the spindle assembly is supported for rotation by a bearing tube that increases the rigidity of the spindle axis.

Although the invention has been described in connection with preferred embodiments and certain alternatives, other alternatives, modifications and variations may be apparent to those skilled in the art in view of the foregoing description. Accordingly, it is intended to embrace all such alternatives, modifications and variations as fall within the spirit and scope of the appended claims.

What is claimed is:

1. A disk storage device, comprising:
   a housing having walls enclosing a clean room chamber;
   at least one data storage disk located in said clean room chamber;
   a read head positioned to cooperate with a surface on said at least one data storage disk to read data recorded thereon; and
   a motor for rotating said at least one data storage disk, said motor including:
   a hub for receiving said data storage disk;
   a shaft attached to said hub for rotation therewith;
   a bearing system including a cylindrical support member and first and second axially spaced bearings for rotatably supporting said shaft and hub, wherein said cylindrical support member is supported on a wall of said housing and has a first portion projecting from said wall into said clean room chamber and a second portion, coaxial with said first portion, projecting from said wall away from said clean room chamber, wherein said first portion and said second portion project approximately the same distance, and wherein at least a portion of said second axially spaced bearing is in a plane coincident with a wall portion of the housing;

a rotor having a cylindrical surface and fixed to said shaft at an end thereof opposite said hub;

an annular permanent magnet mounted on the cylindrical surface of said rotor; and a stator including a winding, said stator being affixed to a wall of said housing and surrounding said annular permanent magnet so as to be spaced therefrom by a cylindrically-shaped air gap, whereby magnetic flux generated by said stator interacts with said permanent magnet to apply a rotary driving force to said rotor, shaft and hub.

2. The disk storage device of claim 1, further comprising an annular sealing member mounted at the end of said first portion of said cylindrical support member to retard the transfer of contaminants from said bearing system into said clean room chamber.

3. The disk storage device of claim 2 wherein a surface of said internal recess is dimensioned to be closely spaced from the outer surface of said first portion of said cylindrical support member, whereby said surfaces form a narrow gap for retarding the transfer of contaminants into said cleanroom chamber.

4. The data storage device of claim 2 wherein said cylindrical surface of said rotor is concentric with and overlaps the second portion of said cylindrical support member.

5. The disk storage device of claim 1, wherein said hub has an internal recess that is shaped to fit around said first portion of said cylindrical support member.

6. The data storage device of claim 5, wherein said hub has an internal annular recess and said first portion of said cylindrical support member protrudes into said annular recess forming a labyrinth seal.

7. The data storage device of claim 1 wherein the portion of said rotor adjacent to said permanent magnet is made of ferromagnetic material.

8. The data storage device of claim 7 further comprising a radially-extending ferromagnetic shield located between said stator and an adjacent section of said wall of said housing.

9. The data storage device of claim 8 wherein said ferromagnetic shield is in the shape of a ring that is coextensive with at least the radial extent of said stator.

10. The data storage device of claim 8 wherein said ferromagnetic shield is in the shape of a ring that is coextensive with the radial extent of said stator, said air gap and a portion of said permanent magnet.

11. The data storage device of claim 1 wherein said motor is a brushless D.C. motor.

12. The data storage device of claim 1 further comprising a labyrinth seal formed by an element on said hub that is closely spaced from an element on a wall of said clean room chamber.

13. The data storage device of claim 12, wherein the labyrinth seal is formed between an annular recess in the hub and an annular protrusion on the wall of the clean room chamber.

14. The data storage device of claim 1 further comprising a circuit support mounted adjacent a wall of said clean room chamber, control circuitry contained on said circuit support for producing timed current pulses for energizing said motor, and a contact pin mounted on said wall for connecting said control circuitry with said stator winding.

15. The data storage device of claim 14 wherein said contact pin is spring-biased toward said circuit support.

16. The data storage device of claim 15 further comprising a conductive pad arranged to engage said spring-biased contact pin, said pad being mounted on said circuit support and connected to said control circuitry.

17. The data storage device of claim 1 wherein said hub and shaft form an integral, one-piece unit.

18. The data storage device of claim 17 wherein said hub and shaft are made of steel.

19. The data storage device of claim 17 wherein said hub and shaft are made of aluminum.

* * * * *